United States Patent
Ahn et al.

(10) Patent No.: US 6,919,932 B2
(45) Date of Patent: Jul. 19, 2005

(54) LIQUID CRYSTAL DISPLAY HAVING UNIFORM INTERVAL BETWEEN PIXEL ELECTRODES

(75) Inventors: Byung-Chul Ahn, Gumi-shi (KR); Hyun-Kyu Lee, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/885,781

(22) Filed: Jul. 8, 2004

(65) Prior Publication Data

US 2004/0239824 A1 Dec. 2, 2004

Related U.S. Application Data

(62) Division of application No. 09/725,154, filed on Nov. 29, 2000, now Pat. No. 6,778,250.

(30) Foreign Application Priority Data

May 25, 1999 (KR) ........................................ 1999-18903

(51) Int. Cl.[7] ........................ G02F 1/136; G02F 1/1343
(52) U.S. Cl. ........................ 349/42; 349/43; 349/139; 257/59; 257/72
(58) Field of Search ........................ 349/42, 43, 139; 257/59, 72

(56) References Cited

U.S. PATENT DOCUMENTS

| | | | | |
|---|---|---|---|---|
| 6,356,319 | B1 * | 3/2002 | Park et al. | 349/43 |
| 6,559,904 | B1 * | 5/2003 | Kwak et al. | 349/43 |
| 6,567,135 | B1 * | 5/2003 | Park | 349/42 |
| 6,839,096 | B1 * | 1/2005 | Jeong et al. | 349/38 |
| 2001/0002143 | A1 * | 5/2001 | Nakayama et al. | 349/39 |
| 2004/0046901 | A1 * | 3/2004 | Matsuoka et al. | 349/43 |

* cited by examiner

Primary Examiner—Tarifur R. Chowdhury
(74) Attorney, Agent, or Firm—McKenna Long & Aldridge LLP

(57) ABSTRACT

A liquid crystal display, and a fabricating method thereof, wherein pixel electrodes are highly accurately located relative to opaque elements, such as gate lines, data lines, or auxilary lines, beneficially by using opaque elements as masking elements when exposing a photosensitive layer through a substrate. The angle of the irradiating light through the substrate can be changed to achieve a desired relative location. A pixel electrode can be located within 1 $\mu$m of a data line. Image stain defects can be reduced.

9 Claims, 9 Drawing Sheets

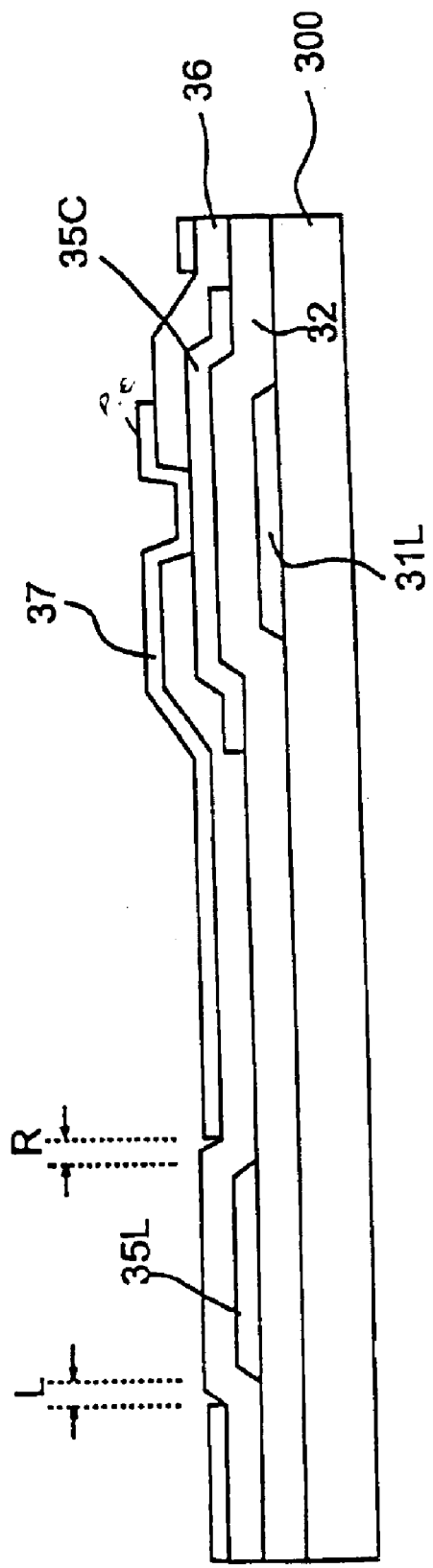

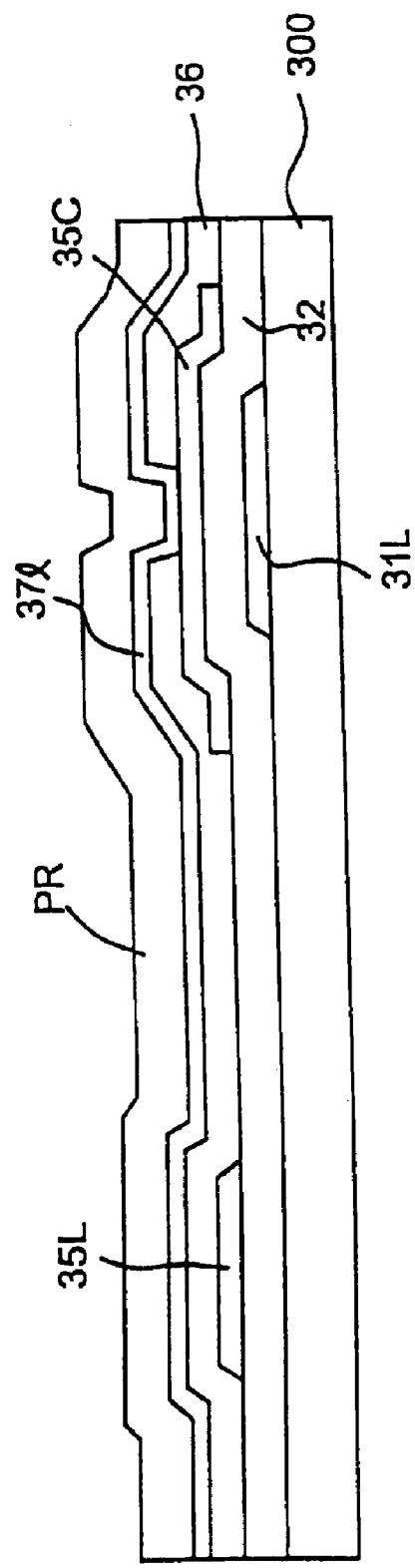

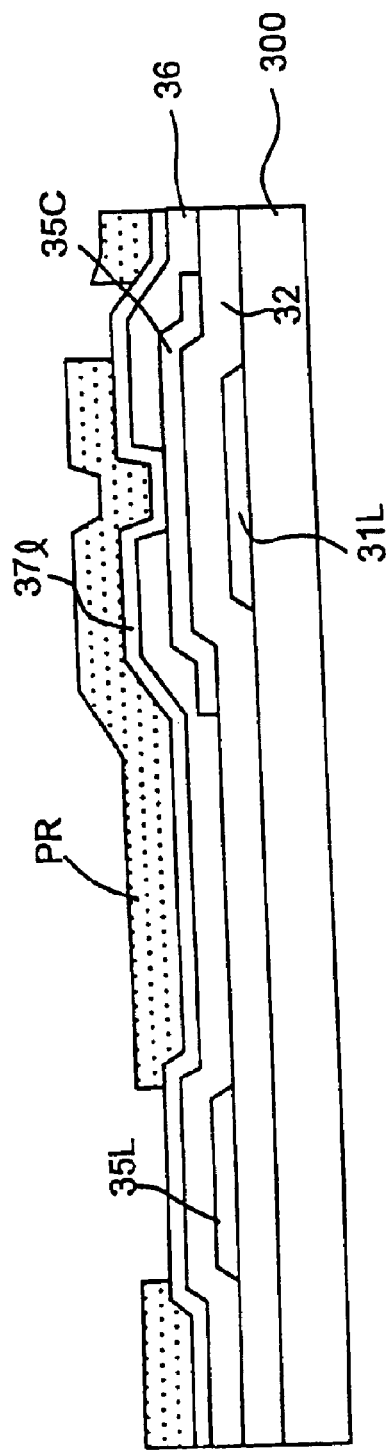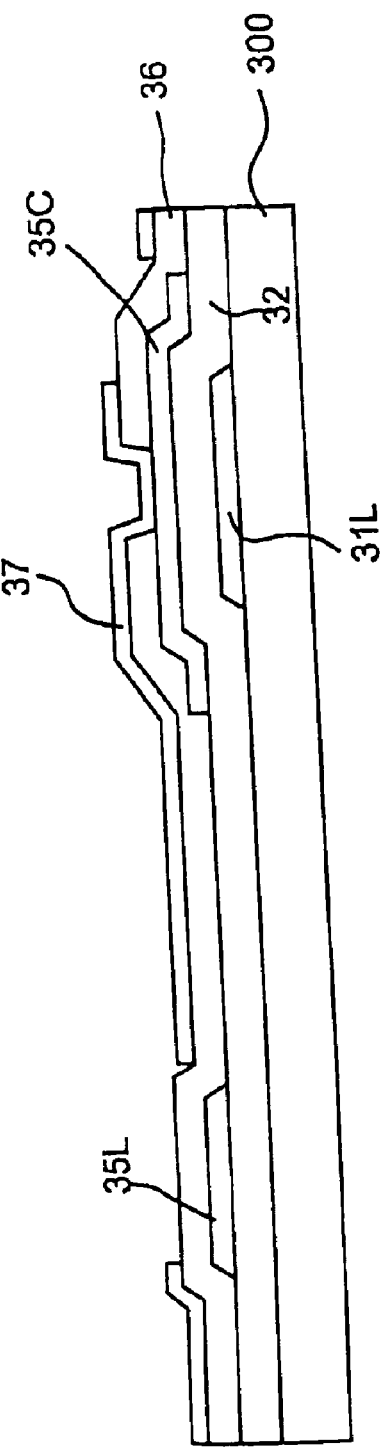

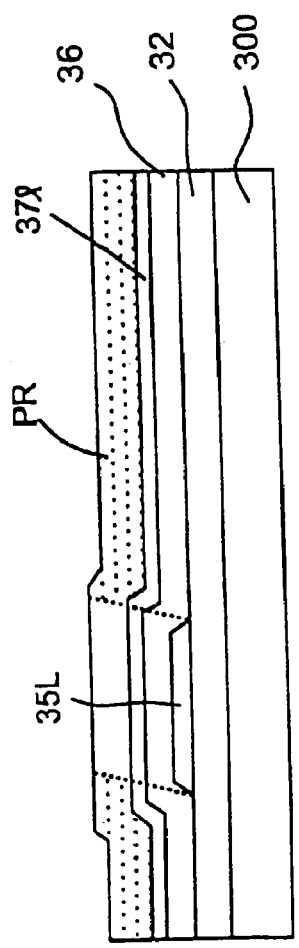
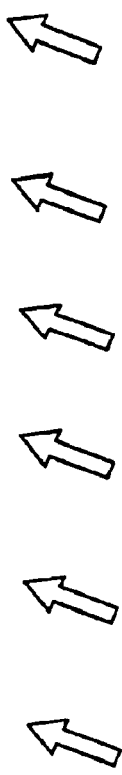
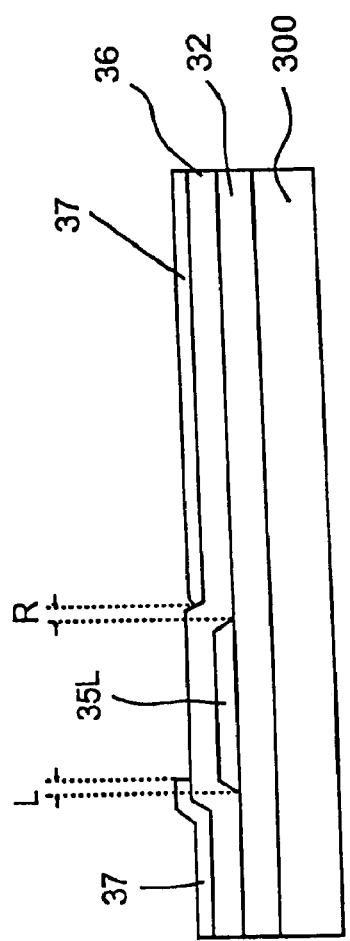
FIG.6A
FIG.6B

LIQUID CRYSTAL DISPLAY HAVING UNIFORM INTERVAL BETWEEN PIXEL ELECTRODES

This application is a Divisional of prior U.S. application Ser. No. 09/725,154, filed Nov. 29, 2000, now U.S. Pat. No. 6,778,250 and claims the benefit of Korean Patent Application No. 1999-18903, filed on May 25, 1999, which is hereby incorporated by reference for all purposes as if fully set forth herein.

BACKGROUND OF THE INVENTION

1. Field of the Invention

The present invention relates to liquid crystal displays. More particularly it relates to active matrix liquid crystal displays (AMLCD) having well-aligned pixel electrodes, and to a method of fabricating such active matrix liquid crystal displays.

2. Discussion of the Related Art

An active matrix liquid crystal display is typically fabricated by joining an upper plate to a lower plate, and then injecting a liquid crystal material between the plates. A lower plate usually includes a plurality of pixel cells that are formed from switching devices (usually thin film transistors) and pixel electrodes. Such lower plates further include a plurality of drive lines that connect drive signals to the pixel cells. An upper plate usually includes a plurality of color filters and a common electrode. To complete an active matrix liquid crystal display, polarizing plates are attached to the upper and lower pirates.

FIG. 1 schematically illustrates a typical prior art active matrix liquid crystal display. As illustrated, data lines, including a data line 15L, cross a plurality of gate lines, including gate lines 11L and 10L. The areas between the data lines and the gate lines define pixel cell regions. A thin film transistor (hereinafter abbreviated TFT) that acts as a switching device is formed at intersections between the data lines and the gate lines.

A TFT includes a gate electrode 11G, which is a protrusion from the gate line 11L, a source electrode 15S, which is a protrusion from the data line 15L, a drain electrode 15D, and an active layer 13. The active layer is overlapped by the electrodes. As shown, a pixel electrode 17 connects to the drain electrode 15D.

Prior art active matrix liquid crystal displays are usually fabricated using photolithograpy. For example, to form the data line 15L and source electrode 15S, the gate line 11L and gate electrode 11G, and the drain electrode 15D a metallic layer is deposited on a prepared substrate. The deposited metallic layer is then coated with a photoresist layer. The deposited metallic layer is then patterned by selectivly exposing the photoresist layer through a prepared mask using a light source that is above the metallic layer. The exposed photoresist layer is then etched to leave metallic conductors for the lines and electrodes. Pixel electrodes are then formed in the same manner. However, pixel electrodes are typically fabricated after the lines and electrodes. Significantly, the pixel electrodes are fabricated from a transparent material.

While the photolithographic process described above has proven useful, it has problems. One particular problem when fabricating prior art active matrix liquid crystal displays is the likelyhood of misalignment of the pixel electrodes relative to other features. Such misalignment may be caused by misalignment of exposure masks or of the exposure apparatus, or by an etch deviation due to etch conditions.

FIG. 2 assists the understanding of pixel electrode misalignment by showing a cross-sectional view taken along the line I–I' of FIG. 1. Initially, a gate insulating layer 12 is formed on a substrate 100. The data line 15L is then photolithographically formed on the gate insulating layer 12. A protection layer 16 is then formed over the structure. Pixel electrodes 17 are then photolithographically formed on the protection layer 16. Ideally, the data line 15L is centered between the pixel electrodes such that the intervals L and R are the same. Unfortunately, the locations of the pixel electrodes can deviate from their intended locations. Such deviations can be caused divisional exposure.

With divisional exposure, each exposure step requires new exposure equipment, such as a photomask, to be set-up. Thus, it is very difficult to control the intervals L and R such that they are even. As a result, image defects referred to as image stains are created. Furthermore, cross-talk between the pixel electrodes and the data lines becomes more severe due to deviations of parasitic capacitances.

Therefore, an improved active matrix liquid crystal display, and a new method of fabricating such an active matrix liquid crystal display, having accurately positioned pixel electrodes would be beneficial.

SUMMARY OF THE INVENTION

Accordingly, the principles of the present invention are directed to a liquid crystal display and to a fabricating method thereof that substantially obviate one or more of the problems due to limitations and disadvantages of the related art.

An object of the present invention is to provide a liquid crystal display, and a fabricating method thereof, which has accurately positioned pixel electrodes. Uniform intervals between pixel electrodes and data lines are created by patterning the pixel electrodes using a self-alignment technique by exposing the pixel electrodes through a substrate.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes a liquid crystal display, wherein a plurality of gate lines cross a plurality of data lines to define locations of a plurality of pixel cells. Switching devices are formed at intersections of gate lines and data lines. Pixel electrodes are formed at the pixel cells, and each pixel electrode connects to a switching device. The pixel electrodes are beneficially formed such that the distance between each side of a pixel electrode and a side of a data line adjacent to the pixel electrode is accurately controlled, preferably less than or equal to 1 μm.

In another aspect, the present invention includes the steps of providing a substrate, fabricating a plurality of gate lines and a plurality of crossing data lines that define a plurality of pixel cells, and forming switching devices at intersections of the gate lines and the data lines. The present invention further includes the steps of depositing a protection layer over the switching devices, gate lines, data lines, and substrate, forming contact holes through the protection layer to expose electrodes of the switching devices, and forming a transparent conductive layer over the exposed surface of the substrate, including the exposed electrodes. Additional steps include forming a negative type photoresist layer on the transparent conductive layer, selectively exposing the negative type photoresist layer through the substrate such that the data lines act as masks, forming a photoresist pattern by developing the selectively-exposed photoresist layer, and etching the transparent conductive layer. Beneficially, before developing the negative type photoresist layer an exposing source and a mask that are above the photoresist layer can also be used to expose the transparent conductive layer.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a cross-sectional view along the line II–II' in FIG. 3;

FIGS. 5A to 5F show cross-sectional views of the LCD shown in FIG. 3 during its fabrication;

FIGS. 6A and 6B are cross-sectional views showing how an interval between a pixel electrode and a data line can be controlled by using the direction of an exposing light.

DETAILED DESCRIPTION OF THE PREFERRED EMBODIMENTS

Reference will now be made in detail to the preferred embodiment of the present invention, example of which is illustrated in the accompanying drawings.

Figure 1:
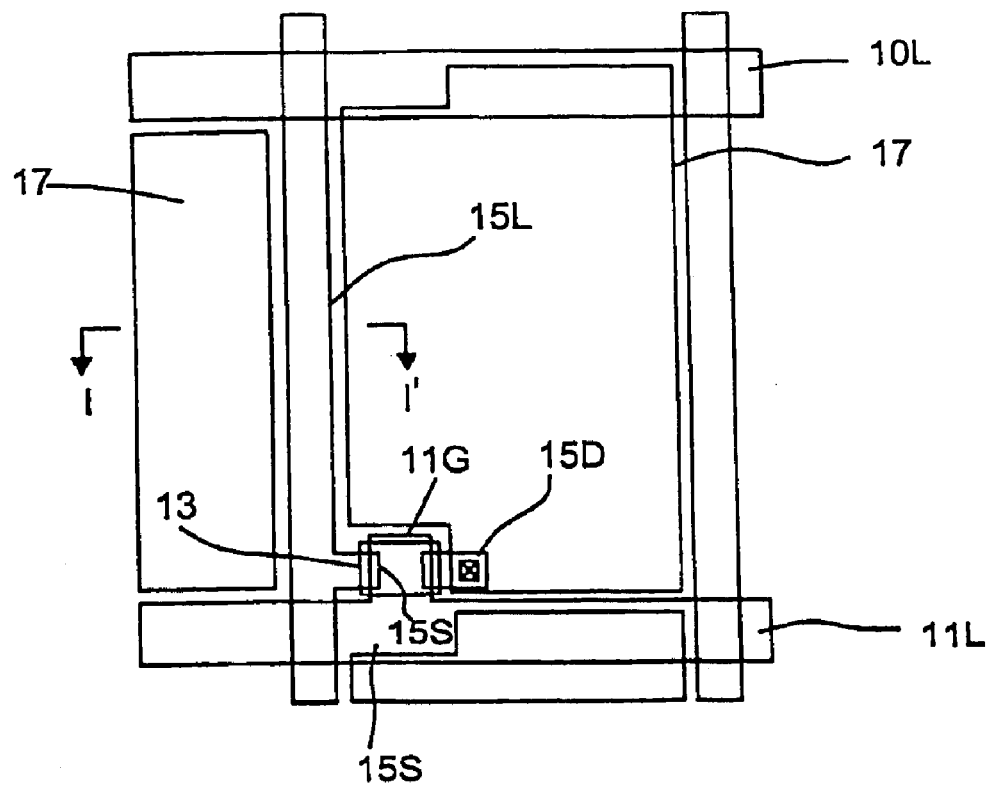
FIG. 1 is shows a simplified schematic view of a prior art LCD.
Figure 2:
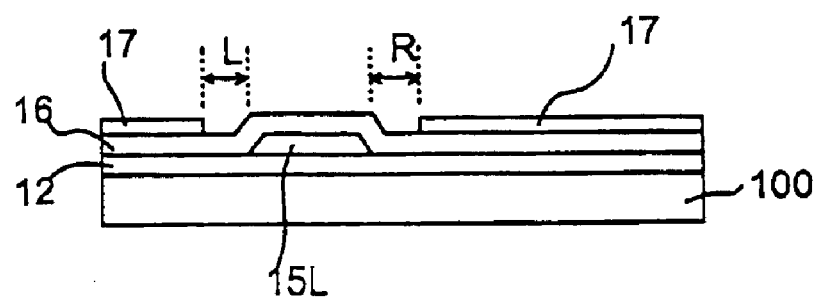
FIG. 2 is a cross-sectional view along the line I–I' in FIG. 1.
Figure 3:
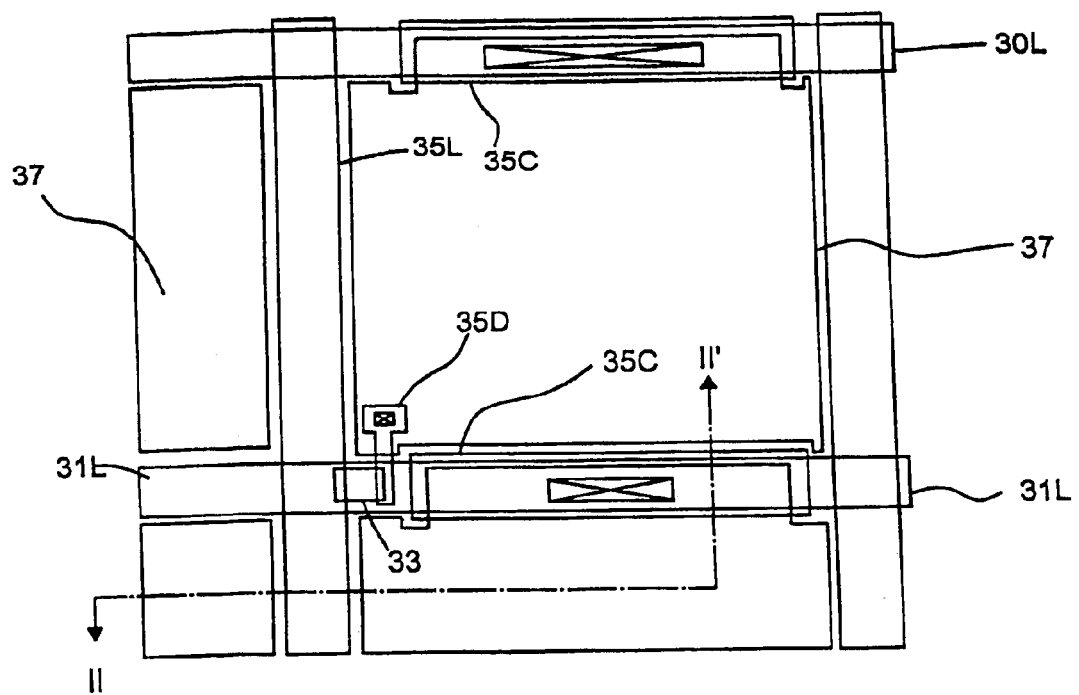
FIG. 3 shows a simplified schematic view of an LCD according to an embodiment of the present invention.

FIG. 3 shows a simplified schematic view of an LCD according to an embodiment of the present invention, while FIG. 4 shows a cross-sectional view of that embodiment taken along the line II–II' of FIG. 3. The illustrated embodiment has a structure in which a plurality of gate lines cross with a plurality of data lines so as to define locations for a plurality of pixel cells. FIG. 3 shows a data line 35L crossing a gate line 31L and a TFT switching device formed at the intersection. The TFT is constructed such that it overlaps with the gate line 31L, the data line 35L, and with a drain electrode. 35D. The TFT includes an active layer 33 that is overlapped with the gate line 31L. This reduces leakage current due to exposure by back lighting. A pixel electrode 37 is then photolithographically formed in the pixel area between gate lines and data lines. The pixel electrode electrically connects to the drain electrode 35D. Furthermore, the pixel electrode overlaps an adjacent gate line 30L, producing a storage capacitor.

According to the principles of the present invention the pixel electrode 37 is formed using self-alignment by exposing a transparent conductor layer that was deposited on the LCD structure by passing light through the LCD structure such that the data line, an auxiliary electrode, or the gate line acts as a mask. By using the data lines and/or the gate lines as masking lines the intervals between the resulting pixel electrodes and the masking lines becomes uniform.

FIG. 4 illustrates the intervals. As shown, an interval designated "L" on the left of a data line 35L is equal to an interval "R" on the right. Therefore, the image stain defect that arises from uneven intervals between pixel electrodes and data lines is prevented.

Still referring to FIG. 4, auxiliary electrodes 35C comprised of the same substance as the data lines are included in the LCD. Each auxiliary electrode, which electrically contacts a pixel electrode, increases the capacitance between a gate line 31L and he contacted pixel electrode 37. This increase in capacitance is partially a result of a reduction in the thickness of a dielectric layer between the gate line 31L and the pixel electrode 37.

FIG. 5A to FIG. 5F show cross-sectional views of the LCD illustrated in FIGS. 3 and 4 during its fabrication. The cross-sectional views are taken along the II–II' in FIG. 3.

Figure 5A:
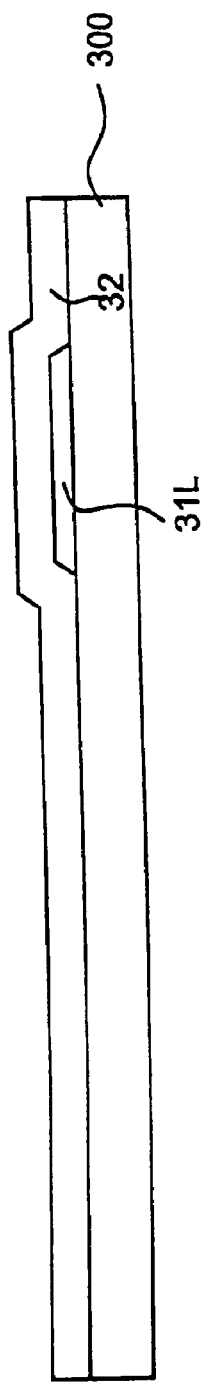

Referring to FIG. 5A, a first conductive layer is deposited on a transparent substrate 300. The first conductive layer is photolithographically patterned to form the gate line 31L. A transparent gate insulating layer 32 is then deposited on the gate line 31L and the substrate 300. An active layer, which is not shown in FIGS. 5A through 5F, is then formed at a predetermined location on the gate insulating layer 32.

Figure 5B:
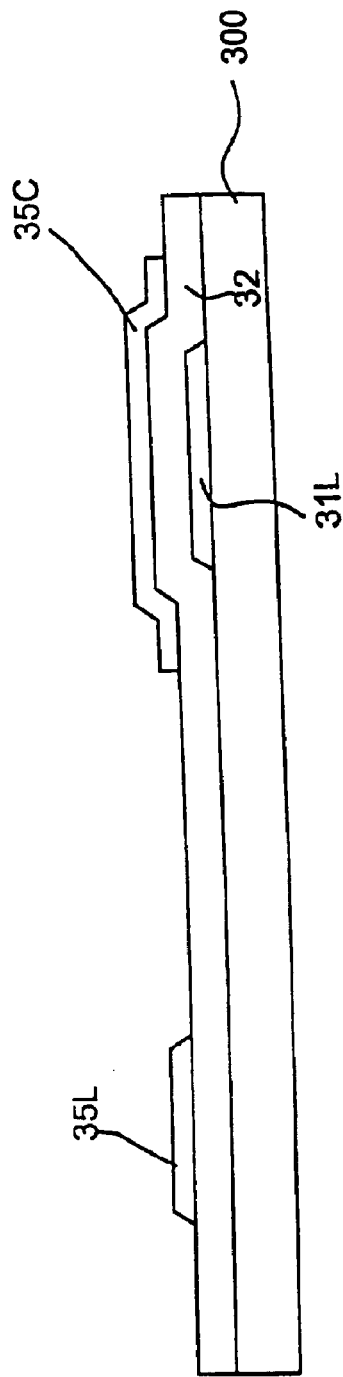

Referring now to FIG. 5B, a second conductive layer is then deposited over the gate insulating layer 32. An auxiliary electrode 35C and a data line 35L are then formed using photolithography. Additionally, a drain electrode that is not shown in the drawing is also formed on the gate insulating layer 32 at this time.

Referring now to FIG. 5C, a protection layer 36 is then applied to the exposed substrate. A contact hole that exposes a portion of the auxiliary electrode 35C is then photolithography formed through the protection layer. While not shown in the figures another contact hole that exposes a portion of the drain electrode is also formed. A transparent conductive layer 37l is then deposited over the exposed surface or the substrate. Then, the transparent conductive layer 37l is coated with a negative type photoresist layer PR.

Figure 5D:
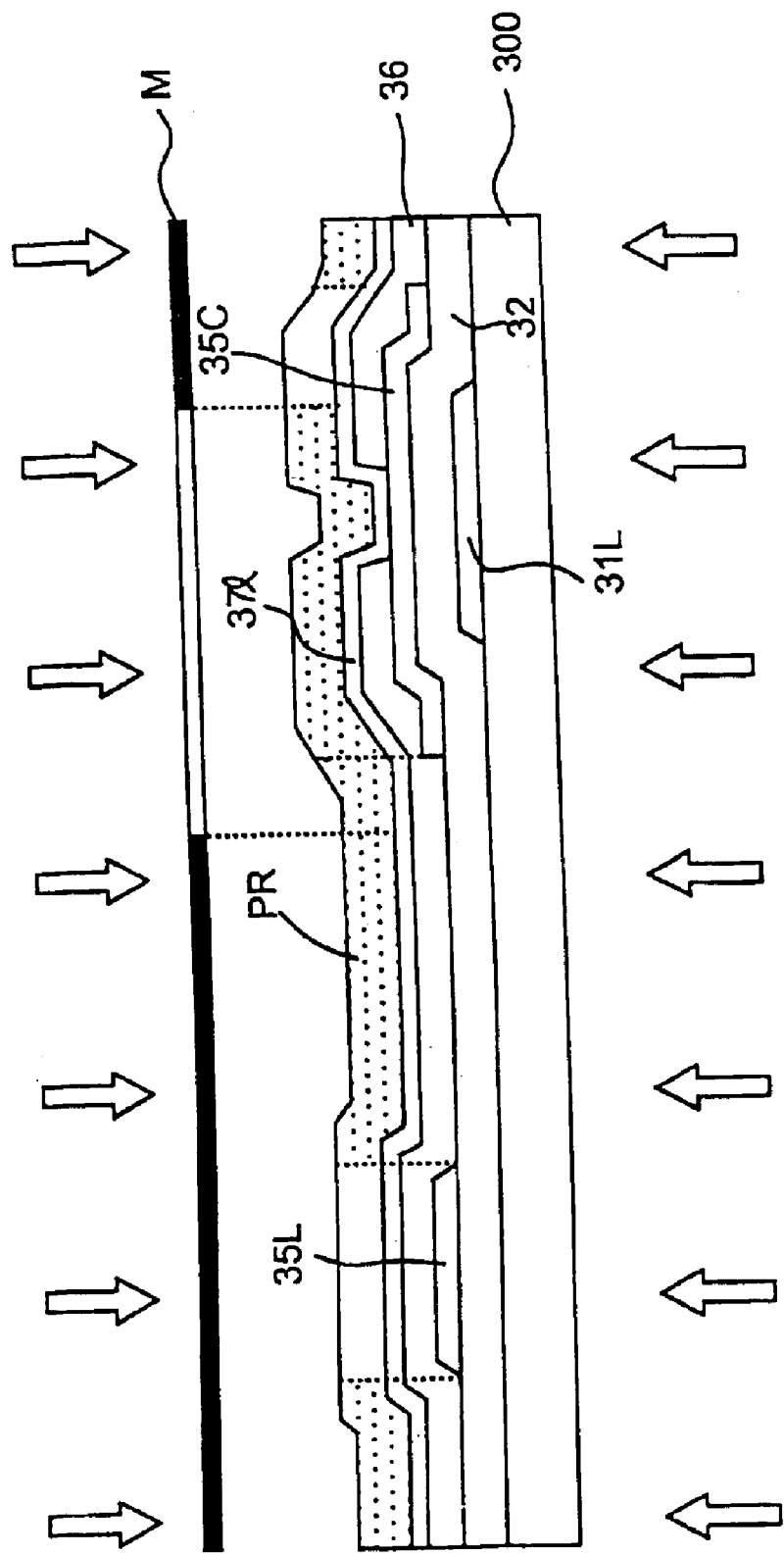

Referring to FIG. 5D, exposure of the negative type photoresist layer PR is performed to define photoresist patterns for the pixel electrodes. As shown in FIG. 5D, the photoresist layer PR is exposured from both sides. This is performed by passing light through the transparent substrate, where the opaque data line 35L and the opaque gate line 31L act as masks, and from above, where a mask M is used. However, if the pixel electrodes are not being used to form storage capacitors with the gates, the front side exposure can be skipped. The mask M block light everywhere but near the gate layer31L/auxiliary electrode 35C. As shown in FIG. 5D, a small area of the negative type photoresist layer PR is blocked both by the mask M and by the auxiliary electrode 35C.

By exposing the negative type photoresist layer PR through the substrate (referred to as back side exposure) the exposing light exposes the negative type photoresist layer PR everywhere except where the gate line 31L, the data line 35L, and the auxilary electrode 35C (if used) mask the photoresist layer PR. Furthermore, it should be understood that the exposure steps need not be performed simultaneously. For example, exposure can be carried out by first exposing from the front side and then from the back, or vice versa.

Referring now to FIG. 5E, the exposed photoresist layer PR is then developed to form a photoresist pattern PR. Referring now to FIG. 5F, pixel electrodes 37 are then formed by etching the transparent conductive layer while using the photoresist pattern PR as a mask. As shown, each pixel electrode 37 is aligned with a data line 35L since that data line acted as a mask during exposure of the negative type photoresist layer PR. Thus, a uniform interval between the pixel electrode 37 and the data line 35L is provided and image stains defects are prevented.

The principles of the present invention address the problem of irregular intervals between data lines and pixel electrodes that result from misalignment of exposure equipment. This is achieved by using the data lines, gate lines, or auxilary lines as a mask by exposing a photoresist through the substrate, back side exposure.

However, the principles of the present invention accomplish even more. For example, they enable the control of the intervals between pixel electrodes and data lines, gate lines, or auxilary lines. Such control is explained with the assistance of FIGS. 6A and 6B. For the convenience those figures use the same nomenclature as FIGS. 5A through 5B. Referring now to FIG. 6A, back side exposure of the negative type photoresist pattern PR is carried out through the substrate 300 and through the transparent conductive layer 37l. However, during back-side exposure the angle of irradiation through the substrate is controlled such that the location of the resulting pixel electrode relative to the data line 35L is controlled. FIG. 6B shows the end result of irradiating the data line 35L with light as shown in FIG. 6A. The pixel electrode on the left side of the data line 35L overlapps with that data line, while the pixel electrode on its right side is separated from the data line 35L by an interval "R". One benefit of the structure that results from FIG. 6B is that light leakage from the left of the data lines is prevented. Of course, light leakage from the right of the data lines can be prevented by changing the angle of the exposing light. Therefore, the intervals between pixel electrodes 37 and data lines 35L can be controlled by controlling the direction and angle of light irradiation through the substrate.

Figure 7:
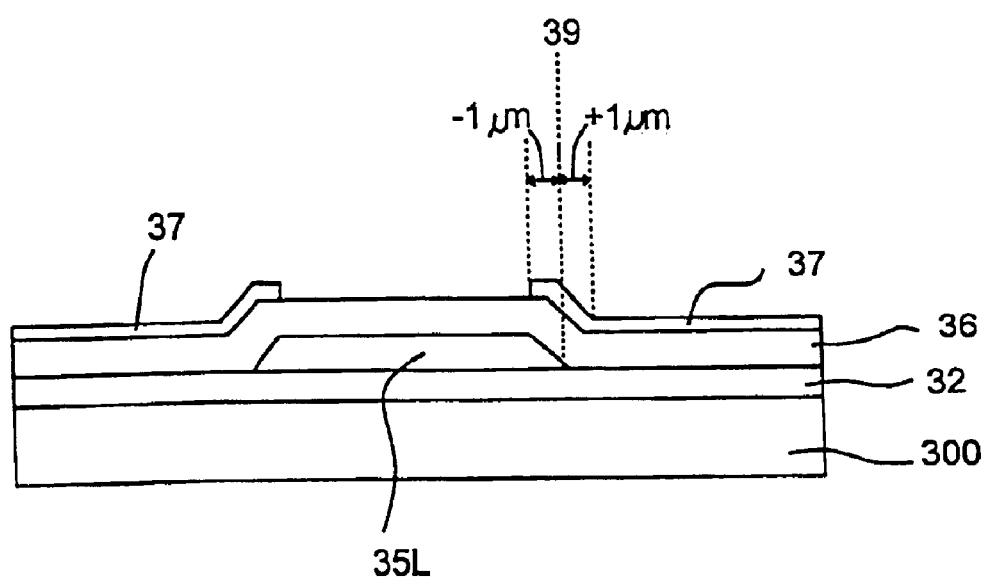
FIG. 7 is a cross-sectional view of an LCD that presents the interval range between a pixel electrode and a data line according to the present invention.

The principles of the present invention can accomplish even more. In high quality LCD it is very important to control critical dimensions, such as the intervals between pixel electrodes 37 and data lines 35L, by changing the irradiation angle. For example, the FIG. 7 illustrates a desirable result of controlling the interval 39 within ±1 µm from the pixel electrode 37, using an edge of the data line 35L as a reference. The critical dimension is thereby controlled by photolithography.

Accordingly, the principles of the present invention enables a reduce in the image stain defect by patterning pixel electrodes such that the pixel electrodes self-align with another element by back-side exposing a photosensitive layer through a substrate. If a data line is the element that is used to self-align the pixel electrodes, a uniform interval between the pixel electrodes and the data lines can result. Moreover, the principles of the present invention enables control of an interval between pixel electrodes and data lines by changing the irradiating angle through the substrate.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display, comprising:
   a plurality of gate lines;
   a plurality of data lines that cross said plurality of gate lines so as to define a plurality of pixel cells;
   a plurality of switching devices at intersections between said plurality of gate lines and said plurality of data lines; and
   a plurality of pixel electrodes, wherein each pixel electrode is in a pixel cell and overlaps a data line, and wherein each pixel electrode electrically connects to a switching device;
   wherein a distance between an edge of each pixel electrode is within about 1 µm of an edge of a data line.

2. The liquid crystal display according to claim 1, wherein two edges of each data line are within about 1 µm of adjacent pixel electrodes.

3. The liquid crystal display according to claim 1, further including a protection layer disposed between said plurality of pixel electrodes and said plurality of data lines.

4. The liquid crystal display according to claim 1, wherein each pixel electrode is separated from an adjacent data line.

5. The liquid crystal display according to claim 1, further including an auxiliary electrode that overlaps a first gate line, wherein said auxiliary electrode is disposed between said overlapped first gate line and a first pixel electrode, and wherein said auxiliary electrode electrically connects to said first pixel electrode.

6. A display device, comprising:
   a plurality of gate lines;
   a plurality of data lines crossing the plurality of gate lines to define a plurality of pixels;
   a plurality of switching devices near the crossings between the plurality of gate lines and said plurality of data lines; and
   first and second pixel electrodes in two of the pixels, wherein one of the data lines is between the first and second pixel electrodes, the first pixel electrode overlaps the data line, and an overlap width between the first electrode and the data line is substantially the same as a distance between an edge of the data line and an edge of the second pixel electrode.

7. The display device according to claim 6, wherein the overlap width is within about 1 µm.

8. The display device according to claim 7, wherein the distance between an edge of the data line and an edge of the second pixel electrode is within about 1 µm.

9. The display device according to claim 7, wherein the second pixel electrode does not overlap the data line.

* * * * *